April 30, 1940.  F. SCHAEFER  2,199,271

CONNECTING PIN

Filed July 16, 1938

INVENTOR.
Frederic Schaefer
BY Brown, Critchlow & Flick
his ATTORNEYS.

WITNESSES
A B Wallace
J A Peckham

Patented Apr. 30, 1940

2,199,271

UNITED STATES PATENT OFFICE 2,199,271

CONNECTING PIN

Frederic Schaefer, Pittsburgh, Pa.

Application July 16, 1938, Serial No. 219,626

7 Claims. (Cl. 85—2)

This invention relates to self-locking connecting pins, and more particularly to pivot-pins used in brake rigging.

Pivot-pins used heretofore for connecting a brake lever to a connecting rod, brake beam strut, pull rod or the like have been solid and provided at one end with a head and at the other end with a transverse opening for receiving a cotter-pin to lock the pivot-pin in position. This requires the use of two fastening members at each connection, and the cotter-pin sometimes breaks or works loose and releases the pivot-pin.

It is among the objects of this invention to provide a connecting pin which is made in one piece, which is relatively light in weight, which is self-locking, which eliminates any necessity for a cotter-pin, and which will not work loose from its position.

In accordance with this invention a metal pin is provided at one end with a head and at the other end with inwardly extending tongues the free ends of which are provided with outwardly projecting portions that form a second head when the tongues are bent outwardly by a tool driven between them. The pin is preferably hollow, and the tongues are formed by providing one end of it with a plurality of circumferentially spaced slots. To facilitate bending of the tongues, they are tapered longitudinally in cross section toward their point of connection with the shank of the pin. This gradual reduction in thickness is all effected from the inside of the tongues so that their outer surfaces will be in line with the outer surface of the body of the pin when the tongues are expanded.

Figure 1:
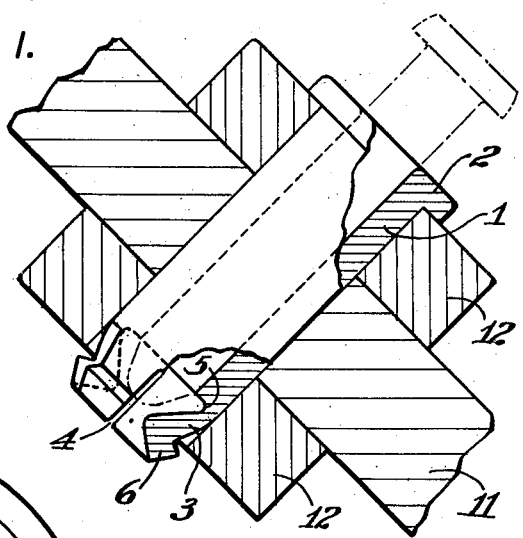
Figure 2:
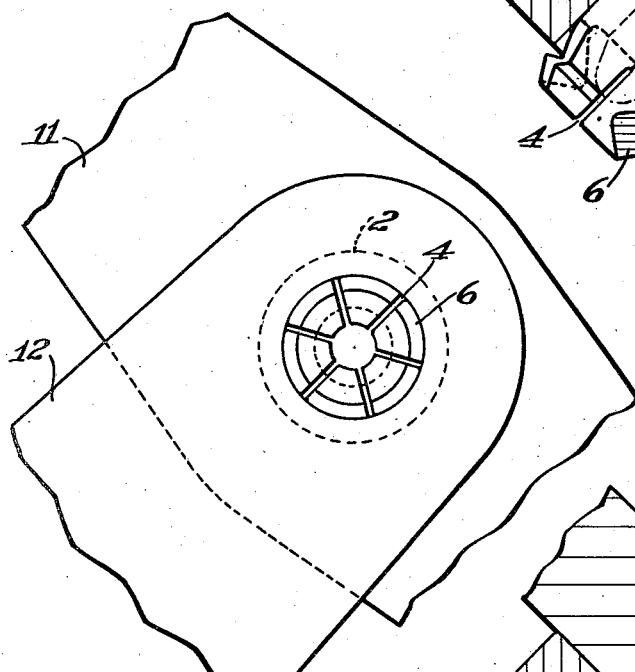
Figure 3:
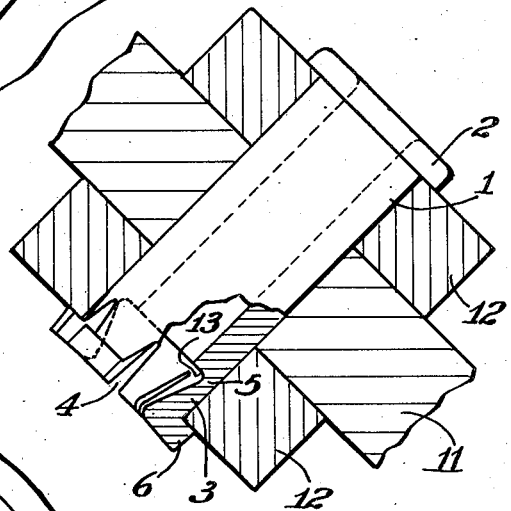
Figure 4:
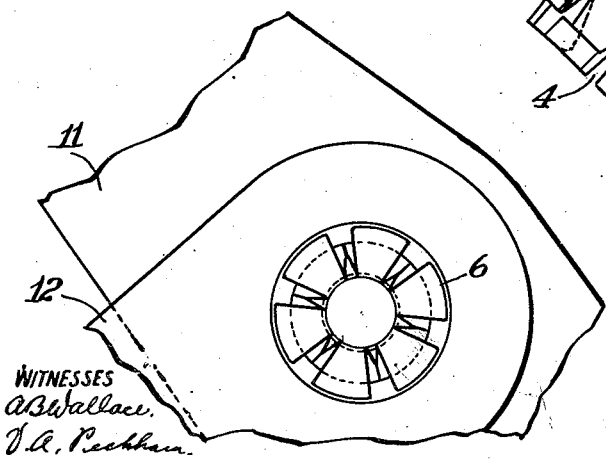

The preferred embodiment of the invention is illustrated in the accompanying drawing in which Fig. 1 is a side view of my pin, partly broken away, disposed in operative position but not locked therein; Fig. 2 is a projected view of the locking end of the pin of Fig. 1; Fig. 3 is a view similar to Fig. 1 showing the pin locked in position; and Fig. 4 is an end view of the pin of Fig. 3.

Referring to Fig. 1 of the drawing, a metal pin has a hollow cylindrical shank 1 provided at one end with a radial flange 2 forming a permanent head. The opposite end of the shank terminates in integral extensions or prongs 3 formed by providing the end portion of the pin with a plurality of circumferentially spaced slots 4 that divide this end of the pin into segments. In forming the pin it is forged with these prongs in line with the wall of the shank, substantially as shown in Fig. 3, and slots 4 are made V-shape, whereby the sides of each prong converge toward its outer end. The prongs are then bent inwardly so that they are inclined toward one another as shown in Fig. 1, thereby making the walls of each slot 4 approximately parallel. The outer or free end of each prong is provided with an integral lug 6 projecting outwardly at substantially right angles to the outer surface of the prong. Each lug is substantially the same size as a corresponding segment of flange 2, and the prongs are bent inwardly far enough to bring these lugs within the circumference of the shank. With this construction in which the lugs do not project radially beyond the shank, they do not prevent the pin from being inserted in an opening adapted to receive it and in which the shank of the pin is intended to fit more or less snugly.

The pin may be used to connect various members together, and, as shown in the drawing, it is especially suitable for use in brake rigging for pivotally connecting a brake lever 11 between the jaws 12 of a connecting rod or pull rod because it is vital that the pin should not become dislodged and permit the lever and rod to separate. After the pin has been inserted in aligned openings in the members that it is to connect, a suitable spreading tool, indicated by broken lines in Fig. 1, is inserted in the shank from its upper or head end. By driving this tool inwardly it will engage and bend the inwardly inclined prongs 3 outwardly to the position shown in Figs. 3 and 4 wherein lugs 6 overlie the lower jaw 12 and form a second head on the pin which is similar to head 2 except that it is divided into a plurality of segments by V-shaped slots 4. The spreading tool is then removed from the double-headed pin which is securely locked in position.

Brake rigging pins must be able to withstand certain specified bearing pressures and shear stresses, but as the shear value is more than met by a solid pin, it is possible to use less metal if the excess metal is removed from the center of the pin. However, if the pin is to meet the specifications the cross-sectional area of the passage through the pin should not exceed 30 per cent of the combined cross-sectional area of the passage and pin. This means that the wall of the pin must be so thick that the prongs would be likely to crack at their point of bending if they were as thick. On the other hand, if they are reduced in thickness throughout their length, they can not be bent outwardly to the proper position by the spreading tool.

It is a feature of this invention that a relatively thick-walled hollow pin of this character can be formed in which the prongs can be readily bent into line with the shank without danger of breaking them. Accordingly, each prong is reduced in thickness at its junction 5 with the pin shank in order that the pin can be bent at point 5 without fracturing it. But, as it is highly desirable that when the prongs are expanded their outer surfaces be in line with the outer surface of the shank, as shown in Fig. 3, the reduction in thickness all occurs from the inside, thereby forming an internal annular shoulder 13 at their inner ends, and the prongs are gradually increased in thickness toward their free ends to substantially the same thickness as the wall of the shank. Due to the resultant tapered cross-sectional form of the prongs, their outer ends are engaged by the spreading tool and forced outwardly by it until their outer surfaces are in line with the outer surface of the shank.

As will be seen in Fig. 3, the jaw 12 that engages prongs 3 is also supported by a material portion of the shank of the pin, whereby there is no danger of the jaw bending the prongs.

According to the provision of the patent statutes, I have explained the principle and construction of my invention, and have illustrated and described what I now consider to be its best embodiment. However, I desire to have it understood that, within the scope of the appended claims, the invention may be practiced otherwise than as specifically illustrated and described.

I claim:

1. A forged hollow metal pivot-pin having a shank provided at one end with a flange forming a head, the opposite end of the shank being provided with a plurality of integral segments forming prongs decreasing in thickness toward their inner ends to form an interior shoulder at their junction with said shank, the outer ends of the prongs being provided with lugs projecting outwardly at substantially right angles thereto, said prongs extending inwardly toward one another with said lugs substantially within the circumference of the shank and being adapted to be bent outwardly by a tool driven through the shank to dispose said lugs in a plane substantially parallel to said head.

2. A hollow metal pin having at one end inwardly extending slots forming a plurality of prongs provided at their outer ends with outwardly projecting lugs, the inner ends of the prongs being thinner than the adjoining wall of the pin body and the outer ends of the prongs being substantially as thick as said wall, the prongs initially being bent inwardly to bring said lugs within the circumference of the pin body, and the outer surfaces of the prongs being substantially in line with the outer surface of said body when the prongs are expanded.

3. A pivot-pin for brake rigging comprising a shank provided with an axial opening therethrough having a cross-sectional area of approximately thirty per cent of the cross-sectional area of the shank and opening together, one end of the shank being turned outwardly to form a head, the opposite end of the shank being provided with a plurality of integral segments forming prongs decreasing in thickness toward their inner ends to form an interior shoulder at their junction with said shank, the outer ends of the prongs being provided with lugs projecting outwardly at substantially right angles thereto, said prongs extending inwardly toward one another with said lugs substantially within the circumference of the shank and being adapted to be bent outwardly by a tool driven through the shank to dispose said lugs in a plane substantially parallel to said head.

4. A pin adapted to be disposed in aligned openings through a plurality of adjoining members, said pin having a hollow shank provided at one end with a flange forming a head adjacent one of said members, the opposite end of the shank being provided with a plurality of circumferentially spaced integral segments forming prongs decreasing in thickness toward their inner ends to form an interior shoulder at their junction with said shank, the outer ends of the prongs being provided with lugs projecting radially outwardly at substantially right angles thereto to form a head adjacent another of said members, the inner diameter of the pin at the outer end of said prongs being the same as the inner diameter of the hollow shank, said latter member encircling said prongs and a portion of said shank, and said prongs being adapted to be bent inwardly toward one another to bring said lugs substantially within the circumference of the shank.

5. A hollow metal brake pin having at one end inwardly extending slots forming six prongs provided at their outer ends with outwardly projecting lugs, the inner ends of the prongs being thinner than the remaining portion thereof and the adjoining wall of the pin body, and said prongs initially being bent inwardly to bring said lugs within the circumference of the pin body.

6. A metal pin having at one end a plurality of spaced prongs the free ends of which are provided with head-forming lugs extending outwardly at substantially right angles thereto, each prong tapering in longitudinal cross section toward its inner end to reduce its thickness at that end in order to facilitate bending of the prong, said prongs being bent inwardly toward the axis of the pin to bring said lugs within the circumference of the pin, and the outer surfaces of the prongs extending inwardly toward the pin axis whereby they may be moved outwardly into line with the outer surface of the body of the pin when the prongs are expanded by a tool driven between them.

7. A hollow metal pin adapted to be disposed in an opening through a perforated member, said pin having at one end a plurality of longitudinal slots forming spaced prongs the inner ends of which are thinner than their remaining portion and the adjoining wall of the pin body to facilitate bending, the free ends of the prongs being provided with outwardly projecting lugs and initially being bent inwardly to bring said lugs and the outer surfaces of the prongs within the circumference of the pin body, whereby a material portion of the prongs may be disposed within the opening through said member when they are expanded, said outer surfaces of the prongs being aligned with the outer surface of said pin body when the prongs are expanded to cause said lugs to form positive stops that prevent removal of the pin from said opening.

FREDERIC SCHAEFER.